United States Patent [19] [11] 3,781,796
Smith [45] Dec. 25, 1973

[54] ERROR DETECTING TRANSLATOR

[75] Inventor: Nicholas Kimbrough Smith, Naperville, Ill.

[73] Assignee: Bell Telephone Laboratories, Incorporated, Murray Hill, Berkeley Heights, N.J.

[22] Filed: Oct. 16, 1972

[21] Appl. No.: 297,670

[52] U.S. Cl. ........................................ 340/146.1 AB
[51] Int. Cl. ........................ G06f 11/00, H03k 13/32
[58] Field of Search ............ 340/146.1 AB, 347 DD; 235/15 BA

[56] References Cited

UNITED STATES PATENTS

| | | | |
|---|---|---|---|
| 3,541,507 | 11/1970 | Duke | 340/146.1 AB |
| 3,559,168 | 1/1971 | Carter et al. | 340/146.1 AB |
| 3,638,184 | 1/1972 | Beuscher et al. | 340/146.1 AB |
| 3,710,318 | 1/1973 | Powell | 340/146.1 AB |

OTHER PUBLICATIONS

Sellers et al., Error Detecting Logic for Digital Computers, McGraw-Hill, 1968, pp. 207–217.

*Primary Examiner*—Charles E. Atkinson
*Attorney*—W. L. Keefauver

[57] ABSTRACT

A signal translation circuit arrangement comprises two translators that operate according to different rules of action. The translators respond to each valid input signal representation by forming identical corresponding output signal representations and the translators respond to each invalid input signal representation by forming nonidentical output signal representations. Invalid input signal representations and circuit malfunctions are detected by comparing the output signals generated by the translators.

3 Claims, 2 Drawing Figures

ERROR DETECTING TRANSLATOR

BACKGROUND OF THE INVENTION

This invention relates to signal translation circuit arrangements which provide for the detection of errors.

Translation circuits are used in digital information systems to translate information from one signal representation to a different signal representation, e.g., the translation of signals from a one-out-of-*n* representation to signals of a binary number representation.

A problem in translation circuits is the detection of errors. Errors in output signals may occur because of malfunctions in the logic hardware of the translation circuit arrangement. Additionally, information signals applied to the input terminals of a translation circuit may be in error. These information signals may be characterized as valid if they exhibit a certain characteristic, e.g., one energized conductor out of N conductors, and invalid if not exhibiting that certain characteristic.

It is priorly known that logic circuit arrangements, including translator circuits, may be designed to be self-checking for hardware malfunctions. In one such arrangement, the circuitry for performing the logic function is duplicated and the resultant output signals of the duplicate circuits are compared to detect errors. Assuming that no malfunctions have occurred, the duplicated circuits will produce identical output signal representations in response to all input signals. If a malfunction occurs in one of the two circuits, at least one input signal representation will result in the duplicated circuits generating output signals which are not identical.

It is also known that translation circuit arrangements may be designed such that their response to valid input signal representations is distinguishable from the response to invalid input signal representations. In order to reduce the amount of logic hardware, certain other translation circuit arrangements generate proper output signals in response to valid input codes, however, the output signals resulting from invalid input codes cannot be distinguished from proper output signals. Thus, separate means for detecting invalid input representations must be provided.

It is an object of this invention to provide a self-checking translation circuit arrangement with the ability to detect both circuit malfunctions and invalid input signals.

SUMMARY OF THE INVENTION

In accordance with this invention, each input signal representation is applied simultaneously to two translators that operate according to different rules of action. According to those rules of action the translators respond to each valid input signal representation by forming identical corresponding output signal representations and the translators respond to each invalid input signal representation by forming nonidentical output signal representations.

In the illustrative embodiment of this invention, the first translator comprises a plurality of individual logic circuits independently connected to corresponding ones of the output terminals of the first translator and connected to those input terminals of the first translator that are defined as being active when a connected output terminal is to be a binary 1. The second translator comprises a plurality of individual logic circuits independently connected to the corresponding ones of the output terminals of the second translator and connected to those input terminals of the second translator defined as being active when a connected output terminal is to be a binary 0.

Advantageously, comparison of the output signals generated by the two translators will detect all invalid input signal representations. Additionally, during the normal process of translating input signals, the arrangement will be self-checking for malfunctions which cause the two translators to generate nonidentical output signals for at least one valid input signal representation. Thus, in the illustrative embodiment the output signals generated by the translators are applied to a comparator which generates an error indication signal if the compared output signals are not identical.

BRIEF DESCRIPTION OF THE DRAWING

This invention will be understood from the following description of the illustrative embodiment when read with respect to the drawing wherein.

DETAILED DESCRIPTION

Figure 1:
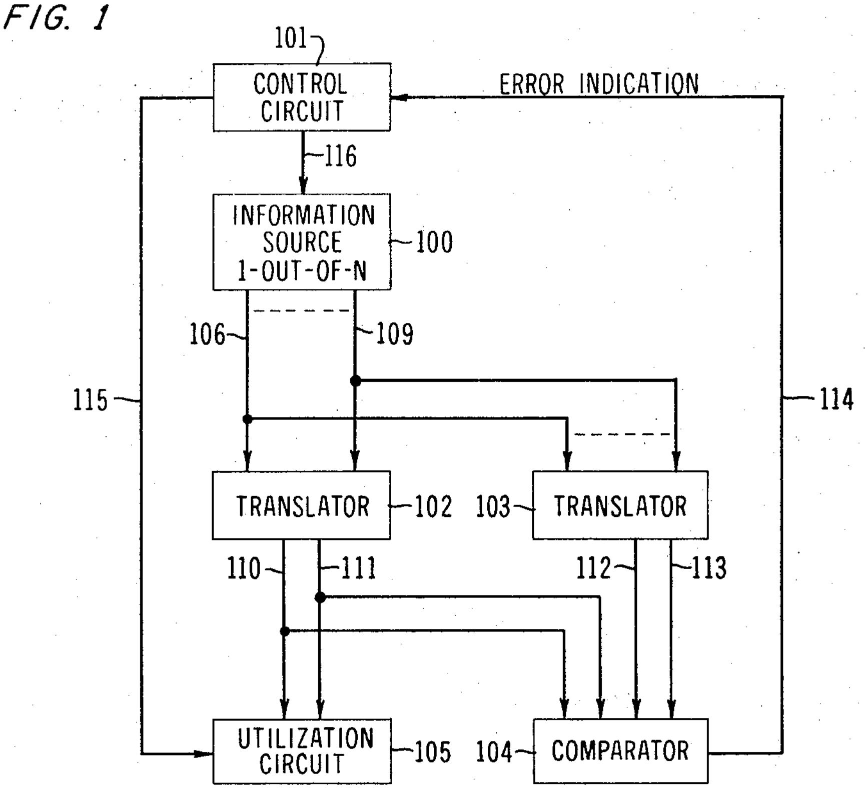
FIG. 1 shows a data processing arrangement wherein a translation circuit arrangement is utilized.

FIG. 1 shows an illustrative translation circuit arrangement which translates signals in one-out-of-*n* representation to binary number representation in a data processor. The translation circuit arrangement comprises the translators 102,103 which operate in accordance with the principles of this invention and the comparator 104 which comprises circuitry of the type well known in the art, e.g., an exclusive-OR tree, for comparing a first set of signals with a second set of signals and generating an output signal when the two sets of signals are not identical.

In operation, the information source 100 responds to control signals received from the control circuit 101 via conductors 116 by simultaneously applying identical signal representations to the input terminals of the translators 102,103 by selectively energizing the conductors 106 through 109. If a signal representation applied to the input terminals of the translators 102,103 exhibits a valid characteristic, e.g., only one of the conductors 106 through 109 is energized, the output signal representations formed by the translators 102,103 are identical assuming that there is no malfunction in the translators 102,103. If a signal representation applied to the input terminals of the translators 102,103 does not exhibit the valid characteristic, the output signal representations formed by the translators 102,103 are not identical, again assuming no translation malfunction. If a malfunction occurs in one of the translators 102,103, the output signal representations formed by the translators 102,103 in response to at least one valid input signal representation are not identical.

The output signals of the translator 102 ar applied to the utilization circuits 105 and to one set of input terminals of the comparator 104. The output signals of the translator 103 are applied to a second set of input terminals of the comparator 104 via conductors 112, 113.

The comparator 104 responds to signals received from the translator 102 which differ from signals received from translator 103 by applying an error indication signal to the control circuit 101 via conductor 114.

Typically, the control circuit 101 responds to an error indication signal by applying a signal to the utilization circuits 105 via conductor 115 which causes the utilization circuits 105 to be unresponsive to the output signals received from the translator 102.

Figure 2:
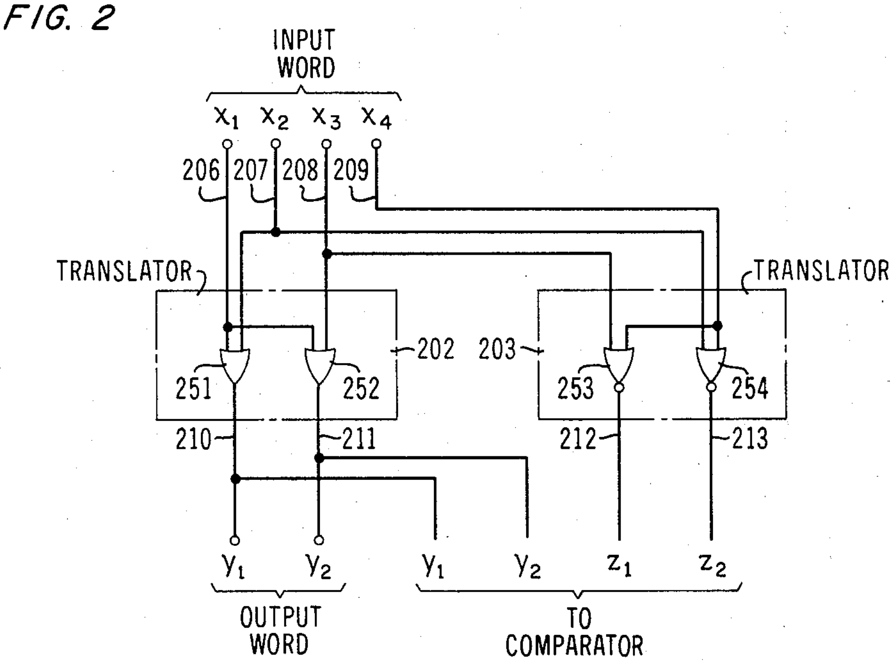
FIG. 2 shows an illustrative circuit arrangement in which signals in one-out-of-four representation are converted to binary number representation by a pair of translator circuits which illustrate the principles of this invention.

FIG. 2 shows an illustrative circuit arrangement in which a pair of translators convert signals in one-out-of-four representation to binary number representation. Input signal representations $X_1$ $X_2$ $X_3$ $X_4$ are applied to the input terminal of the translation arrangement and the output representations formed by the translators 202 and 203 are $Y_1$ $Y_2$ and $Z_1$ $Z_2$, respectively. The response of the two translators to all valid input representations is shown in truth table form in Table 1.

TABLE 1

| $X_1$ | $X_2$ | $X_3$ | $X_4$ | $Y_1$ | $Y_2$ | $Z_1$ | $Z_2$ |
|---|---|---|---|---|---|---|---|
| 1 | 0 | 0 | 0 | 1 | 1 | 1 | 1 |
| 0 | 1 | 0 | 0 | 1 | 0 | 1 | 0 |
| 0 | 0 | 1 | 0 | 0 | 1 | 0 | 1 |
| 0 | 0 | 0 | 1 | 0 | 0 | 0 | 0 |

In accordance with the principles of the invention, the logic expression for each output bit representation of the translator 202 is formed from those input bit representations defined as a binary one when that output bit is to be a binary one. Thus, translator 202 comprises OR gates 251 and 252 which form the logic expressions $Y_1 = X_1 + X_2$ and $Y_2 = X_1 + X_3$, respectively.

Further in accordance with this invention, the logic expression for each output bit representation of the translator 203 is formed from those input bit representations defined as a binary one when that output bit is to be a binary zero. Thus, translator 203 is comprised of NOR gates 253 and 254 which form the logic expressions $Z_1 = \overline{X_3 + X_4}$ and $Z_2 = \overline{X_2 + X_4}$, respectively.

In response to all invalid input representations the binary number output representations $Y_1$ $Y_2$ and $Z_1$ $Z_2$ will be different. For example, if $X_1\ X_2\ X_3\ X_4 = 0011$, then $Y_1\ Y_2 = 01$ and $Z_1\ Z_2 = 00$.

Additionally, for all malfunctions which may occur in translator 202 or translator 203 at least one valid input representation will result in nonidentical output signal representations. For example, assume that a malfunction occurs in NOR gate 254 resulting in output representation $Z_2$ being binary 1. Table 2 indicates the response of the two translators to valid input signal representations with $Z_2$ always a binary 1 and shows that nonidentical output representations are generated by the translators 202 and 203 for the valid input indications 0100 and 0001.

TABLE 2

| $X_1$ | $X_2$ | $X_3$ | $X_4$ | $Y_1$ | $Y_2$ | $Z_1$ | $Z_2$ |
|---|---|---|---|---|---|---|---|
| 1 | 0 | 0 | 0 | 1 | 1 | 1 | 1 |
| 0 | 0 | 0 | 0 | 1 | 0 | 1 | 1 |
| 0 | 0 | 1 | 0 | 0 | 1 | 0 | 1 |
| 0 | 0 | 0 | 1 | 0 | 0 | 0 | 1 |

It is to be understood that the above-described arrangement is merely illustrative of the application of the principles of the invention; numerous other arrangements may be derived by those skilled in the art without departing from the spirit and scope of the invention.

What is claimed is:

1. A translating circuit arrangement comprising:
a plurality of input terminals;
a plurality of output terminals;
first and second translators each comprising: a set of input terminals, a set of output terminals, and circuitry for selectively energizing the said plurality of output terminals responsive to signals applied to the said set of input terminals;
said plurality of input terminals of said arrangement connected to said sets of input terminals of said first and said second translators;
said plurality of output terminals of said arrangement connected to said set of output terminals of said first translator;
comparing means comprising: an error terminal, input terminals connected to said sets of output terminals of said first and of said second translators, and means for comparing output signals at the said sets of output terminals of said first and of said second translators and for generating an error signal when the said output signals are not identical;
characterized in that,
signals applied to said plurality of input terminals of said arrangement have a certain characteristic when valid; and
said circuitry of said first translator and said circuitry of said second translator comprise: means for generating identical output signals at their respective set of output terminals in response to signals having said certain characteristic, and means for generating nonidentical output signals at their respective set of output terminals in response to signals not exhibiting said certain characteristic.

2. A translating circuit arrangement in accordance with claim 1 characterized in that,
said circuitry of said first translator comprises:
a plurality of independent logic circuits individually connected to corresponding ones of said set of output terminals of said first translator and connected to those of said set of input terminals of said first translator that are defined as being active to generate an active signal on a connected output terminal; and
said circuitry of said second translator comprises:
a plurality of independent logic circuits individually connected to corresponding ones of said set of output terminals of said second translator and connected to those of said second set of input terminals of said second translator that are defined as being active to generate an inactive signal on a connected output terminal.

3. A translating circuit arrangement for use with one-out-of-*n* coded data, comprising:
a plurality of input terminals;
a plurality of output terminals;
a first translator, comprising: a set of input terminals connected to said plurality of input terminals, and a set of output terminals connected to said plurality of output terminals;
a second translator, comprising: a set of input terminals connected to said plurality of input terminals, and a set of output terminals;
comparing means having an error terminal and connected to said sets of output terminals of said first and of said second translators comprising: means for comparing output signals at the said sets of output terminals and for generating an error signal when the said output signals are not identical;

characterized in that, said first translator further comprises: a plurality of NOR circuits individually connected to corresponding ones of said set of output terminals and connected to those of said set of input terminals that are defined as being active to generate an active signal on a connected output terminal; and said second translator further comprises: a plurality of NOR circuits individually connected to corresponding ones of said set of output terminals of said second translator and connected to those of said set of input terminals of said second translator that are defined as being active to generate an inactive signal on a connected output terminal.

* * * * *

UNITED STATES PATENT OFFICE
CERTIFICATE OF CORRECTION

Patent No. 3,781,796 Dated December 25, 1973

Inventor(s) Nicholas K. Smith

It is certified that error appears in the above-identified patent and that said Letters Patent are hereby corrected as shown below:

Column 1, line 68, "a binary 1" should read --a binary "1"--. Column 2, line 6, "a binary 0" should read --a binary "0"--. Column 2, line 63, "ar applied to" should read --are applied to--. Column 3, line 50, "being binary 1" should read --being binary "1"--. Column 3, line 52, "a binary 1" should read --a binary "1"--. Column 3, third line of Table 2, "0 0 0 0" should read --0 1 0 0--. Column 5, line 5, "NOR circuits individually" should read -- OR circuits individually -- .

Signed and sealed this 23rd day of July 1974.

(SEAL)
Attest:

McCOY M. GIBSON, JR.
Attesting Officer

C. MARSHALL DANN
Commissioner of Patents

FORM PO-1050 (10-69)
USCOMM-DC 60376-P69
☆ U.S. GOVERNMENT PRINTING OFFICE : 1969 O—366-334